United States Patent
Kicker

(10) Patent No.: US 8,974,261 B2
(45) Date of Patent: Mar. 10, 2015

(54) ADJUSTABLE DOUBLE BLADED WATER PADDLE

(71) Applicant: Dale Kevin Kicker, Dresser, WI (US)

(72) Inventor: Dale Kevin Kicker, Dresser, WI (US)

( * ) Notice: Subject to any disclaimer, the term of this patent is extended or adjusted under 35 U.S.C. 154(b) by 0 days.

(21) Appl. No.: 14/312,288

(22) Filed: Jun. 23, 2014

(65) Prior Publication Data

US 2014/0363295 A1 Dec. 11, 2014

Related U.S. Application Data

(63) Continuation-in-part of application No. 13/915,456, filed on Jun. 11, 2013, now Pat. No. 8,801,483.

(51) Int. Cl.
*B63H 16/04* (2006.01)
*F16B 7/04* (2006.01)

(52) U.S. Cl.
CPC .............. *B63H 16/04* (2013.01); *F16B 7/042* (2013.01); *B63B 2221/00* (2013.01)
USPC ........................................................ 440/101

(58) Field of Classification Search
CPC ...................................................... B63H 16/04
See application file for complete search history.

(56) References Cited

U.S. PATENT DOCUMENTS

| 4,605,378 | A | * | 8/1986 | Hamilton | 440/102 |
| 4,820,216 | A | * | 4/1989 | Masters | 440/101 |
| 6,022,255 | A | * | 2/2000 | Lukanovich | 440/101 |
| 7,367,858 | B2 | * | 5/2008 | Matuska et al. | 440/101 |
| 8,235,760 | B2 | * | 8/2012 | Rechner et al. | 440/101 |

* cited by examiner

*Primary Examiner* — Edwin Swinehart
(74) *Attorney, Agent, or Firm* — Jacobson & Johnson; Thomas N. Phung

(57) ABSTRACT

A water paddle comprising a first shaft having and a second shaft, a first cog collar located on an exterior surface of first shaft and having a first set of teeth extending radially from a mating end of first cog collar, a second cog collar located on an exterior surface of second shaft and having a second set of teeth extending radially from a mating end of second cog collar, second set of teeth mateable with first set of teeth to prevent rotational movement between shafts, a ferrule extending from a free end of second shaft, a snap button-alignment tab assembly comprising a bushing, a wavy washer, and a snap button base located within ferrule and a snap button skirt connected to free end of ferrule and an alignment tab fixed within first paddle shaft downstream of a set of corresponding holes of first paddle.

20 Claims, 5 Drawing Sheets

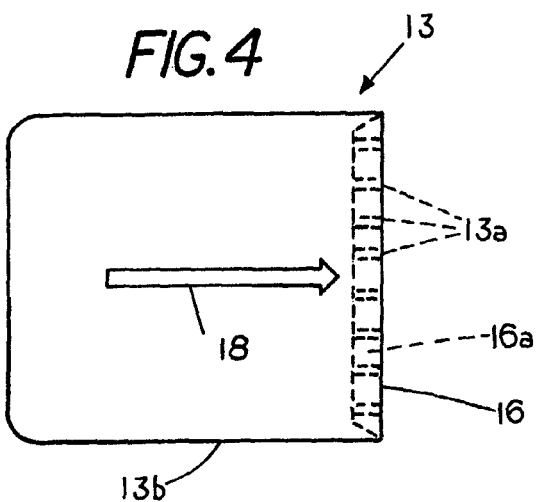
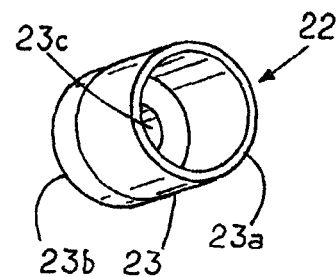
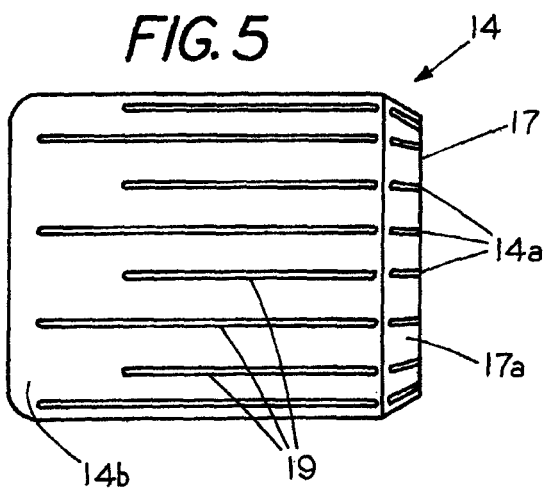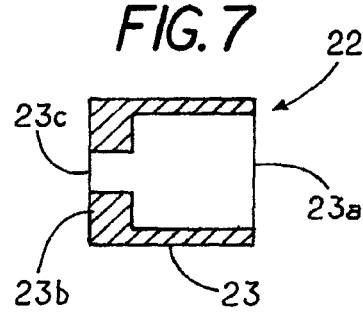
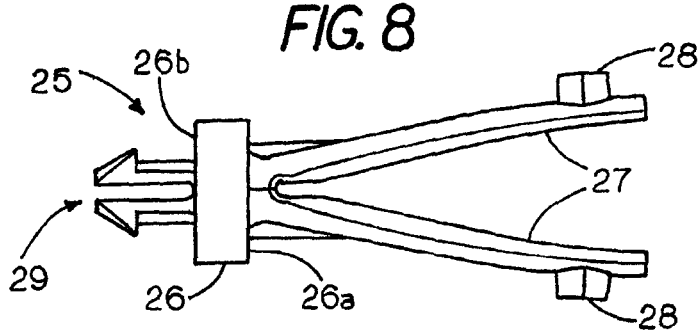

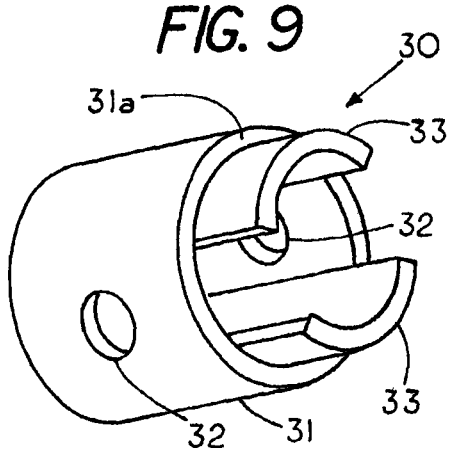
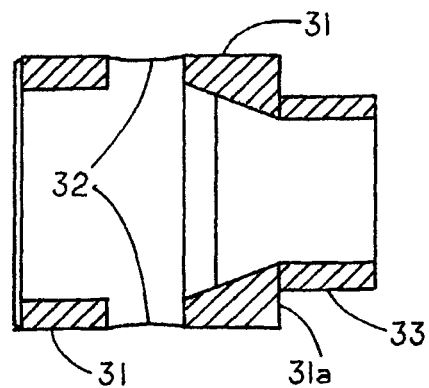
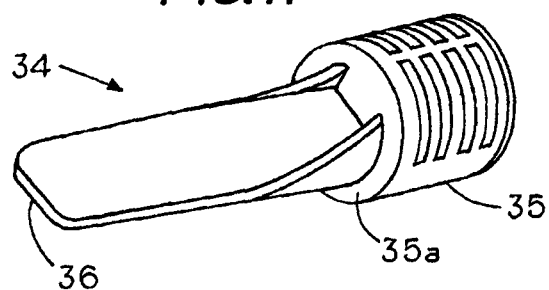
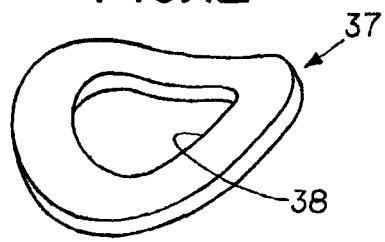

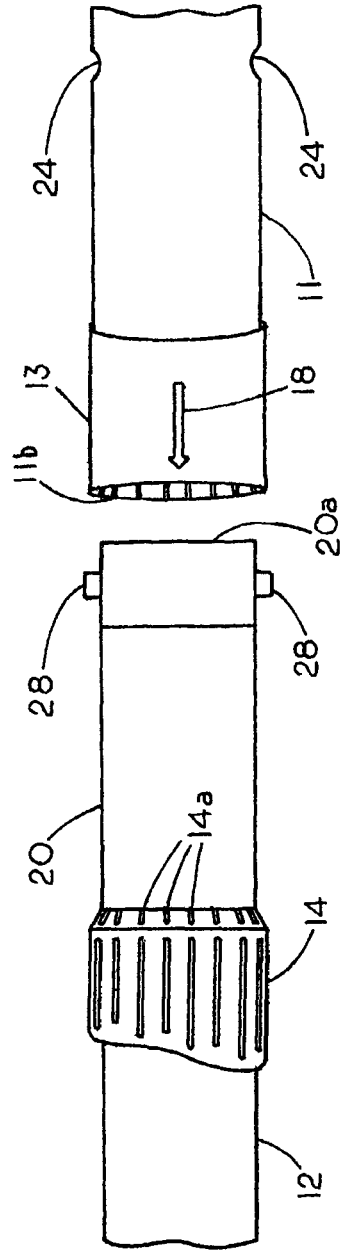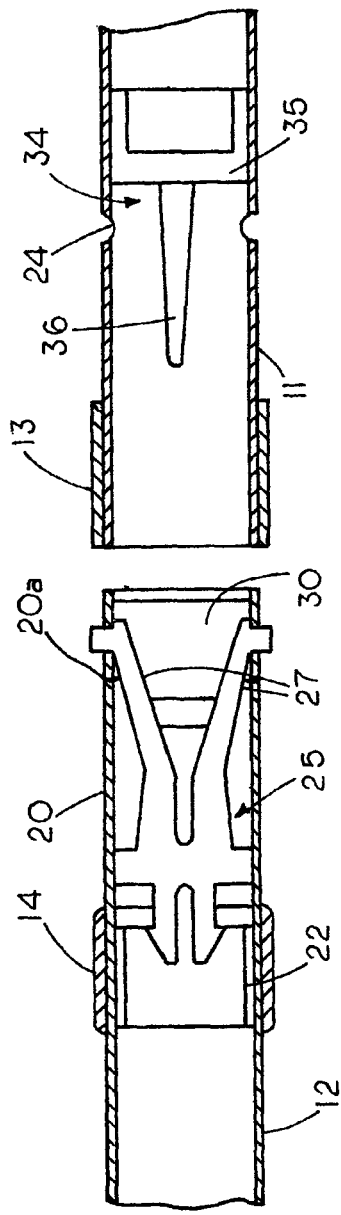

ADJUSTABLE DOUBLE BLADED WATER PADDLE

CROSS REFERENCE TO RELATED APPLICATIONS

This application is a continuation-in-part of currently pending U.S. application Ser. No. 13/915,456; filed Jun. 11, 2013; titled ADJUSTABLE DOUBLE BLADED WATER PADDLE, which claims priority to U.S. Provisional Application Ser. No. 61/689,590; filed Jun. 11, 2012; titled WATER PADDLE COUPLER.

FIELD OF THE INVENTION

This invention relates generally to water paddle and, more specifically to an adjustable double bladed water paddle that allows for the angularly positioning of a pair of opposing paddle blades relative to each other about a paddle axis.

STATEMENT REGARDING FEDERALLY SPONSORED RESEARCH OR DEVELOPMENT

None

REFERENCE TO A MICROFICHE APPENDIX

None

BACKGROUND OF THE INVENTION

The use of double-bladed paddles are well known in the field of recreational water sports and more specifically to non-motorized watercrafts such as canoes and kayaks in order to allow users to optimize the performance of their watercrafts. Double-bladed paddles preferably have blades with planes that are offset from each other by an angle between 0 and 90 degrees, a term generally defined as being feathered. Feathering of the blades function to allow each of the blades to cut cleanly through the air during the forward stroke leading to minimum windage thereby alleviating some of the stress on the user's wrist resulting from the windage.

One of the problems associated with using feathered double-bladed paddles is that they may take some getting used to since a user's paddling style may differ due to the specific user's body type and comfort level. Since a user's paddling style generally differs from user to user, using a double-bladed paddle that is feathered to a fixed blade angle, which the user is not comfortable with may lead to possible wrist injuries due to the repetitive stress on the user's wrist resulting from the uncomfortable fixed feathered angle of the blades.

Double-bladed water paddle that allow for the custom angularly positioning or custom feather of the blades are known in the art but have numerous deficiencies. For example, U.S. Pat. No. 6,881,111 to Bridge et al. discloses a paddle shaft coupling system comprising a first shaft having protrusions located at the opposite end of a paddle blade. The protrusions are inserted into an interior of a second shaft until the protrusions are extended into receptacles, which are located completely within the second shaft. One of the problems associated with U.S. Pat. No. 6,881,111 is that since the protrusions mate with the receptacles inside the second shaft, obstructions that may hinder and/or prevent the mating or engagement of the protrusions and receptacles are not only difficult to detect but also difficult to remove from inside of the shaft and may require special tools to assist in their removal. The aforementioned is especially problematic if the water paddle is used around sandy beaches where grains of sand may often time get into the paddle shafts.

Another problem associated the water paddle disclosed in U.S. Pat. No. 6,881,111 is that since it provides for a one-button disconnection system, accidental bumps on the release button by the user during usage of the water paddle may result in accidental disconnection of the paddle shafts leading to safety concerns to the user.

BRIEF SUMMARY OF THE INVENTION

The present invention comprises an adjustable double bladed water paddle that allows for the angularly positioning of a pair of opposing paddle blades relative to each other about a paddle axis. The water paddle coupler includes a first paddle shaft having a paddle blade end and a free end and a second paddle shaft having a blade end and a free end.

Located on an exterior surface of the first paddle shaft proximal the free end of the first paddle shaft is a first cog collar having a plurality of teeth extending radially from a mating end of the first cog collar proximal the free end of the first shaft and accessible to the user's fingers.

Located on an exterior surface of the second paddle shaft proximal the free end of the second paddle shaft is a second cog collar having a plurality of teeth extending radially from a mating end of the second cog collar proximal the free end of the second shaft and accessible to the user's fingers, the second set of teeth mateable with the first set of teeth to prevent rotational movement between the paddle shafts.

The water paddle includes a ferrule extending from the free end of the second paddle shaft, the ferrule having a free end with the second collar located between the paddle blade and the free end of the ferrule.

The water paddle also includes a snap button-alignment tab assembly having a first unit comprising a snap button bushing, a wavy washer, and a snap button base located within an interior surface of the ferrule and a snap button skirt connected to the free end of the ferrule and the snap button base and a second unit comprising an alignment tab securely fixed within an interior surface of the first paddle shaft downstream of a set of corresponding holes of the first paddle. The first unit and second unit of the of the snap button-alignment tab functions by cooperating to lockingly connect the first paddle shaft with the second paddle shaft to prevent linear movement between the paddle shafts while providing for a dual-button release system.

BRIEF DESCRIPTION OF THE DRAWINGS

FIG. 4 shows a top view of a first cog collar of the adjustable double bladed water paddle of FIGS. 1 and 3.

FIG. 5 shows a top view of a second cog collar of the adjustable double bladed water paddle of FIGS. 1 and 3.

FIG. 6 is a perspective view of a snap button bushing of FIG. 3;

FIG. 7 is a cross-section view of the snap button bushing of FIG. 6;

FIG. 8 is a side view of a snap button base of FIG. 3;

FIG. 9 is a perspective view of a snap button skirt of FIG. 3;

FIG. 10 is a cross-section view of the snap button skirt of FIG. 10;

FIG. 11 is a perspective view of an alignment tab of FIG. 3;

FIG. 12 is a perspective view of a wavy washer of FIG. 3;

FIG. 13 shows a close-up perspective view of the first end of a ferrule aligned with a free end of the first paddle shaft;

FIG. 14 shows a cross-sectional view of the adjustable double bladed water paddle of FIG. 13;

DESCRIPTION OF THE PREFERRED EMBODIMENT

Figure 1:
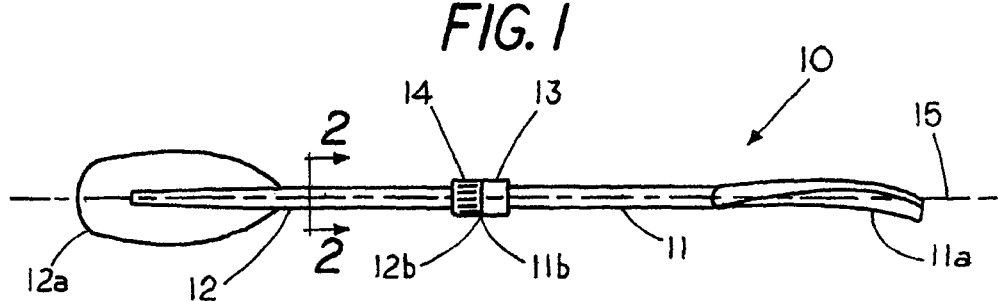
FIG. 1 is a perspective view showing an adjustable double bladed water paddle.

FIG. 1 is a perspective view showing an adjustable double bladed water paddle 10 of the present invention. Adjustable double bladed water paddle 10 generally comprises a first paddle shaft 11 having a paddle blade end 11a and a free end 11b and a second paddle shaft 12 having a blade end 12a and a free end 12b. First paddle shaft 11 and second paddle shaft 12 are shown with a first cog collar 13 and a second cog collar 14 engaging each other in an assembled and ready to use condition. A feature of adjustable double bladed water paddle 10 is that cog collars 13 and 14 function to allow for the visual angularly positioning of first paddle shaft 11 and second paddle shaft 12 relative to each other about a paddle axis 15.

Figure 2:
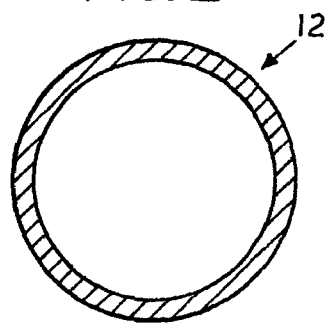
FIG. 2 shows a cross-sectional view of adjustable double bladed water paddle of FIG. 1 taken along the lines 2-2.

FIG. 2 is a cross-sectional view showing adjustable double bladed water paddle 10 taken along the lines 2-2 which shows shaft 12 comprising a circular shaped cross-section.

Referring to FIGS. 3-12, FIG. 3 shows an exploded, perspective view of the coupling components of adjustable double bladed water paddle 10, which functions to allow for the angularly positioning of first paddle shaft 11 and second paddle shaft 12 and in turn the angular positioning of blade ends 11a and 11b, relative to each other about paddle axis 15 (shown in FIG. 1).

Figure 3:
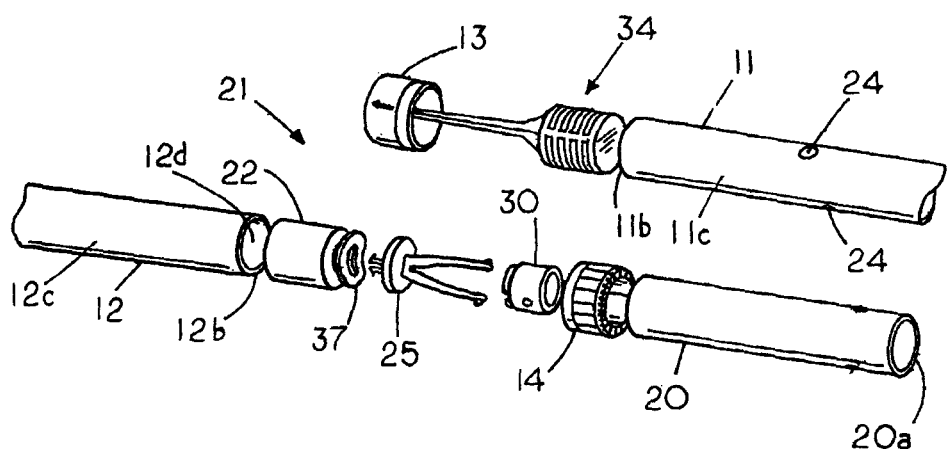
FIG. 3 shows an exploded, perspective view of the coupling components of the adjustable double bladed water paddle of FIG. 1.

FIGS. 4 and 5 are each top views showing cog collars 13 and 14 of the adjustable double bladed water paddle 10 of FIGS. 1 and 3. FIG. 6 is a perspective view and FIG. 7 is a cross-section view of the snap button bushing of FIG. 3.

As shown in the embodiment of FIG. 3 the coupling components of adjustable double bladed water paddle 10 generally comprise cog collar 13 located on an exterior surface 11c of first paddle shaft 11 proximal the free end 11b of first paddle shaft 11. Second paddle shaft 12 includes cog collar 14 located on an exterior surface 12c of the second paddle shaft 12 proximal the free end 12b of the second paddle shaft 12. The cog collars 13 and 14 may be fixedly secured to their respective paddle shafts 11 and 12 by a plurality of means including but not limited to the use of various types of adhesive, heat bonded thereto, and being pre-molded thereto.

Cog collars 13 and 14 are similar to each other in size and shape with cog collar 13 including a plurality of teeth 13a (shown in FIGS. 4 and 5) which in the embodiment of FIGS. 1 and 3 are shaped and sized to form a fitted engagement with a plurality of teeth 14a of cog collar 14 wherein the mating engagement of the teeth 13a, 14a of the cog collars 13 and 14 prevents rotation of second paddle shaft 12 relative to first paddle shaft 11 along paddle axis 15 formed by the connection of paddle shafts 11 and 12. The mating between first set of teeth and second of set teeth 14a also forms a gap-free water seal engagement between the cog collars 13 and 14 while preventing free play or wiggle movement between paddle shafts 11 and 12 while in the use condition. In the embodiment of FIGS. 3, 4, and 5, first and second set of teeth 13a and 14a may also include the feature of being tapered to provide for a guiding engagement for a quick and accurate connection between the cog collars 13 and 14.

A feature of the present invention is that due to their location both on the external surfaces of paddle shafts 11 and 12, teeth 13a, 14a of cog collars 13 and 14 are readily and easily accessible to the user's fingers to allow the user not only to visually detect obstructions therein or therebetween but to also allow the user to easily clear the teeth of obstructions that may hinder their mating or engagement without the need for tools. This feature is particularly advantageous when adjustable double bladed water paddle 10 is used around sandy beaches where grains of sand may often times get stuck between the teeth 13a, 14a of the cog collars 13 and 14. It is noted that in alternative embodiments of the present invention, the plurality of teeth of the cog collars may be positioned on a shear plane instead of vertical plane to the shaft.

Referring to FIGS. 4 and 5, first cog collar 13 is shown including a sleeve 16 extending from an end of first cog collar 13 with an interior surface 16a of the sleeve connecting to the first set of teeth 13a to provide structural support to the first set of teeth 13a. Second cog collar 14 includes a tapering skirt 17 extending from an end of the second cog collar 14 with an exterior surface 17a of the tapering skirt 17 connecting to the second set of teeth 14a to provide structural support to the second set of teeth 14.

First cog collar 13 also includes a dial indicating rib 18 extending from an exterior surface 13b of first cog collar 13 and second cog collar 14 includes a set of ribs 19 radially positioned on and extending from an exterior surface 14b of the second cog collar 14 to provide for a visual and touch-feel indicator markings. It is noted that each of the ribs 19 of second cog collar 14 may be separated radially at least 5 degrees and preferable 15 degrees from each other for user reference purposes.

The adjustable double bladed water paddle 10 also includes a ferrule 20 that is partially supported within an interior surface 12d of second paddle shaft 12 and functions to link second paddle shaft 12 to first paddle shaft 11. Ferrule 20 includes a free end 20a that extends from the free end 12b of second paddle shaft 12 with cog collar 14 positioned between paddle blade 12a and the free end 20a of ferrule 20. The portion of ferrule 20 that extends from the free end 12b of second paddle shaft 12, in use, is supported within an interior surface of first paddle shaft 11.

Adjustable double bladed water paddle 10 further includes a locking mechanism comprising a snap button-alignment tab assembly 21 located away or in a spaced condition from the cog collars 13 and 14 and within the interior of the paddle shafts 11 and 12 for maintaining the connection between the left and right paddle shafts 11 and 12. As such snap button-alignment tab assembly 21 is not a part of cog collars 13 and 14 and may function independently of cog collars 13 and 14.

Snap button-alignment tab assembly 21 generally comprises five main parts, namely an alignment tab 34, a snap button base 25, a snap button bushing 22, a snap button skirt 30, and a wavy washer 37. (See FIGS. 3-12.) As shown in FIG. 3 snap button bushing 22, wavy washer 37, snap button base 25, and snap button skirt 30 comprises a first unit and alignment tab 34 comprises a second unit. In the assembled condition of snap button-alignment tab assembly 21 snap button bushing 22, wavy washer 37, and snap button base 25 are positioned within ferrule 20 and snap button skirt 30 is locate at the free end 20a of ferrule 20 that with a portion of snap button skirt 30 extending within ferrule 20 and alignment tab 34 is positioned within the interior of first paddle shaft 11.

FIG. 6 is a perspective view and FIG. 7 is a cross-sectional view of the snap button bushing 22 of FIG. 3, which is supported within an interior surface of ferrule 20 preferably in a fixed condition. Snap button-bushing 22 may be fixedly secured to the interior surface of ferrule 20 by a plurality of means including but not limited to the use of various types of adhesive, heat bonded thereto, pinning, and being pre-molded thereto. Snap button bushing 22 generally comprises a cylindrical-shaped body 23 having an open-end 23a and a closed-end 23b. Located on closed end 23b is a central slot 23c.

FIG. 8 shows a side view of the snap button base 25 of FIG. 3. Snap button base 25, as shown in the embodiment of FIG. 8, generally comprises a circular-shaped main body 26 having a first side 26a and a second side 26b. Extending from first side 26a of circular-shaped main body 26 is a set of flexible arms 27 each supporting a pushable or displaceable opposing button 28 thereon with the buttons 28 functioning for engaging corresponding holes 24 located on the first paddle shaft 11. Extending from second side 26b of circular-shaped main body 26 is a two-prong retaining peg 29, which extends through the central slot 23c of the closed end 23b of snap button bushing 22 to securely connect the snap button base 25 to the snap button bushing 22 while allowing for the lateral rotational movement of the snap button base 25 within ferrule 20 with respect to the snap button bushing 22.

FIG. 9 is a perspective view and FIG. 10 is a cross-section view of the snap button skirt 30 of FIG. 3. Snap button skirt 30 generally comprises a cylindrical-shaped body 31 having a pair of diametrically opposing holes 32 thereon for receiving the displaceable opposing buttons 28 of snap button base 25 and a pair of opposing skirt tabs 33 extending from an end 31a of the body 31 of snap button skirt 30. As shown in FIG. 3 in the assembled condition of snap button-alignment tab assembly 21 snap button skirt 30 is placed over a portion of the flexible arms 27 of the snap button base 25 containing displaceable opposing buttons 28 with the displaceable opposing buttons 28 on the flexible arms 27 extending through the pair of diametrically opposing holes 32 of the snap button skirt 30 to maintain the connection between snap button skirt 30 and snap button base 25. The connection between snap button skirt 30 and snap button base 25 also functions to protect the flexible arms 27 of snap button base 25 from damage by providing the flexible arms 27 with increase stability and structural support.

FIG. 11 is a perspective view of showing the alignment tab 34 of FIG. 3. Alignment tab 34 generally comprises a cylindrical-shaped body 35 having a tab or tongue 36 extending from an end 35a of cylindrical-shaped body 35. Cylindrical-shaped body 35 is fixedly secured within the interior surface of the first paddle shaft 11 with cylindrical-shaped body 35 positioned proximate the corresponding holes 24 of first paddle shaft 11 with corresponding holes 24 positioned between the free end 11b of first paddle shaft 11 and the cylindrical-shaped body 35 of alignment tab 34 and with tongue 36 located towards the free end 11a of right paddle shaft 11. The tongue 36 of the alignment tab 34 functions to slide between the flexible arms 27 of the snap button base 25 and rotate the buttons 28 located on the flexible arms 27 of snap button base 25 into alignment with the holes 24 located on first paddle shaft 11.

FIG. 12 is a perspective view showing the wavy washer 37 of FIG. 3, which in the assembled condition of snap button-alignment tab assembly 21, is located within the interior of second paddle shaft 12 between the circular-shaped main body 26 of snap button base 25 and the closed end 23b of snap button bushing 22. Wavy washer 37 includes a central slot 38 for receiving a portion of two-prong retaining peg 29 therethrough. In use wavy washer 37 functions to receive a mild compression enabling wavy washer 37 to apply pressure to keep the displaceable opposing buttons 28 on the flexible arms 27 of snap button base 25 in a forward position to allow reliable engagement in the button holes 24 in the first paddle shaft 11 while also allowing the snap button base 25 to freely rotate so alignment tab 34 may align the opposing buttons 28 on flexible arms 27 with the button holes 24 of the first paddle shaft 11.

Figure 15:
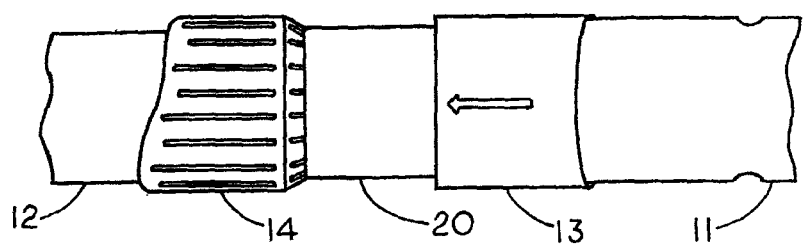
FIG. 15 shows a close-up perspective view of the first end of the ferrule being slid into the free end of first paddle shaft.

Referring to FIGS. 13-16, FIGS. 13, 15, and 16 each show close-up perspective views of the steps of forming a one-piece double-bladed paddle 10 from first paddle shaft 11 and paddle shaft 12. FIG. 14 shows a cross-sectional view of the adjustable double bladed water paddle of FIG. 13. In forming a one-piece double-bladed paddle 10 from first paddle shaft 11 and second paddle shaft 12, first end 20a of ferrule 20 having snap button skirt 30 engaged thereto is initially aligned with the free end 11b of first paddle shaft 11 as shown in FIG. 13. Ferrule 20 is then slid into the free end 11b of first paddle shaft 11 as shown in FIGS. 13 and 15 until the tongue 36 of alignment tab 34 comes into contact with the flexible arms 27 of snap button base 25, and more specifically until the tongue 36 of alignment tab 34 comes into contact with a portion of snap button base 25 located between flexible arms 27 (shown in FIGS. 8 and 14).

Paddle shafts 11 and 12 are then angularly positioned at a desired position relative to each other, which can be accomplished either by aligning dial indicator rib 18 to a desired rib 19 located on second cog collar 14 or through the visual alignment of the opposing paddle blades to the desired offset position after which the tongue 36 of alignment tab 34 are further extended towards the circular-shaped main body 26 of snap button base 25.

Figure 16:
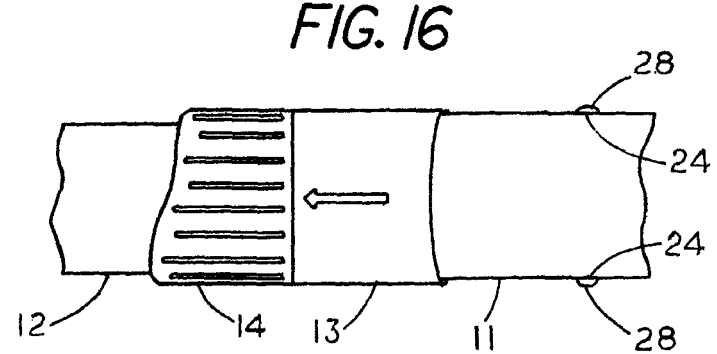
FIG. 16 shows a close-up perspective view of the free end of the first paddle shaft being brought towards the free end of the second paddle shaft to obtain positive visual and auditory locking connection confirmation.

Extending the tongue 36 of alignment tab 34 further towards the circular-shaped main body 26 causes the snap button base 25 to rotate within first shaft 11 until the displaceable opposing buttons 28 of snap button base 25 are aligned with the corresponding holes 24 of first paddle shaft 11 and eventually leading to the engagement of the plurality of teeth 13a of cog collar 13 with the plurality of teeth 14a of cog collar 14 as shown in FIG. 16 and to the extension of displaceable opposing buttons 28 of snap button base 25 through the corresponding holes 24. The extension of displaceable opposing buttons 28 of snap button base 25 through the corresponding holes 24 functions to secure the connection of paddle shafts 11 with paddle shaft 12 by assisting in preventing paddle shaft 11 from being disconnected with paddle shaft 12. The engagement of the plurality of teeth 13a of cog collar 13 with the plurality of teeth 14a of cog collar 14 prevents further angularly positioning or rotational movement of paddle shafts 11 and 12 with respect to each other.

To displace of first paddle shafts 11 with respect to second paddle shaft 12, a user depresses both displaceable opposing buttons 28 of snap button base 25 sufficiently through the holes 24 of first paddle shaft 11 to unsecure the connection of paddle shafts 11 with paddle shaft 12. The user then applies sufficient opposing force on paddle shafts 11 and 12 to disengage the plurality of teeth 13a of cog collar 13 with the plurality of teeth 14a of cog collar 14 allowing for separation first paddle shaft 11 with respect to second paddle shaft 12.

The present invention also includes a method of forming an adjustable double bladed water paddle 10 comprising the steps of (1) inserting a free end 20a of a ferrule 20 of a second paddle shaft 12 into an interior of first paddle shaft 11; (2) bringing the tongue 36 of alignment tab 34 located within an interior of the first paddle shaft 11 and spaced downstream from a first cog collar 13 into contact with the flexible arms 27 of snap button base 25; (3)) rotating the first paddle shaft 11 with respect to the second paddle shaft 12 to obtain a desired water paddle feathered position; (4)) further extending the tongue 36 of alignment tab 34 towards the circular-shaped main body 26 of snap button base 25 to rotate snap button base 25 while inside of first paddle shaft 11 until the displaceable opposing buttons 28 of snap button base 25 are aligned with the corresponding holes 24 of first paddle shaft 11; and (5)) locking the first paddle shaft 11 to the second paddle shaft 12 to maintain the desired water paddle feathered position by bringing the free end 11b of the first paddle shaft 11 further towards a free end 12b of the second paddle shaft 12 until the user hears an auditory indicator of positive locking connection confirmation.

The above method may also include the step of (6)) bringing the free end 11b of the first paddle shaft 11 further towards the free end 12b of the second paddle shaft 12 until the user sees positive visual locking connection confirmation identified by an engagement of the displaceable opposing buttons 28 of snap button base 25 with the corresponding holes 24 of the first paddle shaft 11.

I claim:

1. An adjustable double bladed water paddle comprising:
a first paddle shaft having a paddle blade end and a free end and a second paddle shaft having a blade end and a free end;
a first cog collar located on an exterior surface of the first paddle shaft proximal the free end of the first paddle shaft, the first cog collar having a first set of teeth extending radially from a mating end of the first cog collar proximal the free end of the first shaft and accessible to the user's fingers;
a second cog collar located on an exterior surface of the second paddle shaft proximal the free end of the second paddle shaft, the second cog collar having a second set of teeth extending radially from a mating end of the second cog collar proximal the free end of the second shaft and accessible to the user's fingers, the second set of teeth mateable with the first set of teeth to prevent rotational movement between the paddle shafts;
a ferrule extending from the free end of the second paddle shaft, the ferrule having a free end with the second collar located between the paddle blade and the free end of the ferrule;
a snap button-alignment tab assembly having a first unit comprising a snap button bushing, a wavy washer, and a snap button base located within an interior surface of the ferrule and a snap button skirt connected to the free end of the ferrule and the snap button base and a second unit comprising an alignment tab securely fixed within an interior surface of the first paddle shaft downstream of a set of corresponding holes of the first paddle, the first unit and second unit of the of the snap button-alignment tab cooperating to lockingly connect the first paddle shaft with the second paddle shaft to prevent linear movement between the paddle shafts while providing for a dual-button release system.

2. The water paddle of claim 1 wherein the snap button bushing is fixedly secured to an interior surface of the ferrule with the snap button bushing comprising a cylindrical-shaped body having an open-end, a closed-end, and a central slot located on the closed end and the snap button base comprising a circular-shaped main body having a set of flexible arms extending from a first side of the circular-shaped main body and a two-prong retaining peg extending from a second side of the circular-shaped main body, the flexible arms each having a displaceable button supported thereon for engagement with the corresponding holes of the first paddle shaft to provide positive visual connection confirmation, the two-prong retaining peg extending through the central slot of the snap button bushing to connect the snap button base to the snap button bushing while allowing for the free lateral rotational movement of the snap button base within ferrule.

3. The water paddle of claim 2 wherein the snap buttons skirt comprises a cylindrical-shaped body having a pair of diametrically opposing holes thereon for receiving the displaceable buttons of the snap button base therethrough and a pair of opposing skirt tabs extending from an end of the cylindrical-shaped body of the snap button skirt, the snap buttons skirt located within the interior surface of the ferrule and the cylindrical-shaped body of the snap button skirt located outside of the ferrule, the snap buttons skirt functioning to protect the flexible arms of the snap button base by providing the flexible arms with increase stability and structural support.

4. The water paddle of claim 2 wherein the wavy washer is located between the snap button base and the snap button bushing and includes a central slot for receiving a portion of the two-prong retaining peg therethrough.

5. The water paddle of claim 2 wherein the cylindrical-shaped body having a tongue extending from an end of the cylindrical-shaped body towards the free end of the first paddle shaft, the tongue functioning to engage and rotate the snap button base to produce an alignment of the displaceable buttons of the flexible arms with the corresponding holes of first paddle shaft.

6. The water paddle of claim 1 wherein the first cog collar includes a sleeve extending from an end of the first cog collar with an interior surface of the sleeve connecting to the first set of teeth to provide structural support to the first set of teeth.

7. The water paddle of claim 1 wherein the second cog collar includes a tapering skirt extending from an end of the second cog collar with an exterior surface of the tapering skirt connecting to the second set of teeth to provide structural support to the second set of teeth.

8. The water paddle of claim 1 wherein the mating between the first set of teeth and the second of set teeth forms a gap free water seal engagement between the cog collars while preventing wiggle movement between the paddle shafts.

9. The water paddle of claim 1 wherein the first cog collar includes a dial indicating rib extending from an exterior surface of the first cog collar and the second cog collar includes a set of ribs radially positioned on and extending from an exterior surface of the second cog collar to provide for a visual and touch-feel indicator markings.

10. The water paddle of claim 1 wherein each of the ribs are separated radially at least 5 degrees from each other.

11. The water paddle of claim 1 wherein the snap button-alignment tab assembly comprises a one-piece member form entirely of plastic.

12. The water paddle of claim 1 wherein the snap button-alignment tab assembly provides an auditory indicator of positive locking connection confirmation between the paddle shafts when the displaceable buttons engages with the corresponding holes of the first paddle shaft.

13. The water paddle of claim 1 wherein the first set of teeth and the second set of teeth are all tapered to provide for a guiding engagement to provide for a quick and accurate connection between the cog collars.

14. An adjustable double bladed water paddle comprising:
a first paddle shaft having a paddle blade end and a free end and a second paddle shaft having a blade end and a free end;
a first cog collar located on an exterior surface of the first paddle shaft proximal the free end of the first paddle shaft, the first cog collar having a first set of teeth extending radially from a mating end of the first cog collar proximal the free end of the first shaft and accessible to the user's fingers;
a second cog collar located on an exterior surface of the second paddle shaft proximal the free end of the second paddle shaft, the second cog collar having a second set of teeth extending radially from a mating end of the second cog collar proximal the free end of the second shaft and accessible to the user's fingers, the second set of teeth mateable with the first set of teeth to prevent rotational movement between the paddle shafts;
a ferrule extending from the free end of the second paddle shaft, the ferrule having a free end with the second collar located between the paddle blade and the free end of the ferrule;
a snap button-alignment tab assembly comprising a snap button bushing, a wavy washer, a snap button base, a snap button skirt, and an alignment tab;
the snap button bushing fixedly secured to an interior surface of the ferrule and comprising a cylindrical-shaped body having an open-end, a closed-end, and a central slot located on the closed end;
the snap button base located within the ferrule and comprising a circular-shaped main body having a set of flexible arms extending from a first side of the circular-shaped main body and a two-prong retaining peg extending from a second side of the circular-shaped main body,
the flexible arms each having a displaceable button supported thereon for engagement with a set of corresponding holes of the first paddle shaft to lockingly connect the first paddle shaft with the second paddle shaft to prevent linear movement between the paddle shafts and providing for a dual-button release system while providing positive visual connection confirmation, the two-prong retaining peg extending through the central slot of the snap button bushing to connect the snap button base to the snap button bushing while allowing for the free lateral rotational movement of the snap button base within ferrule;
the snap button skirt comprising a cylindrical-shaped body having a pair of diametrically opposing holes thereon for receiving the opposing buttons of the snap button base and a pair of opposing skirt tabs extending from an end of the cylindrical-shaped body of the snap button skirt, the snap button skirt connected to the free end of the ferrule with the opposing skirt tabs located within the interior surface of the ferrule;
the wavy washer located between the snap button base and the snap button bushing and includes a central slot for receiving a portion of the two-prong retaining peg therethrough
the alignment tab comprising a cylindrical-shaped body fixedly secured within an interior surface of the first paddle shaft downstream of the corresponding holes of the first paddle, the cylindrical-shaped body having a tongue extending from an end of the cylindrical-shaped body towards the free end of the first paddle shaft, the tongue functioning to engage and rotate the snap button base to produce an alignment of the displaceable buttons of the flexible arms with the corresponding holes of first paddle shaft.

15. The water paddle of claim 14 wherein the mating between the first set of teeth and the second of set teeth forms a gap free water seal engagement while preventing wiggle movement between the paddle shafts.

16. The water paddle of claim 15 wherein the first cog collar includes a dial indicating rib extending from an exterior surface of the first cog collar and the second cog collar includes a set of ribs radially positioned on and extending from an exterior surface of the second cog collar to provide for a visual and touch-feel indicator markings.

17. The water paddle of claim 16 wherein each of the ribs is separated radially at least 5 degrees from each other.

18. The water paddle of claim 17 wherein the snap button-alignment tab assembly provides an auditory indicator of positive locking connection confirmation between the paddle shafts when the displaceable buttons engages with the corresponding holes of the first paddle shaft.

19. A method of forming an adjustable double bladed water paddle comprising the steps of:
inserting a free end of a ferrule of a second paddle shaft into an interior of a first paddle shaft;
bringing a tongue of an alignment tab located within the interior of the first paddle shaft and spaced downstream from a first cog collar of the first paddle shaft into contact with a set of flexible arms of a snap button base;
rotating the first paddle shaft with respect to the second paddle shaft to obtain a desired water paddle feathered position;
further extending the tongue of the alignment tab towards a circular-shaped main body of the snap button base to rotate the snap button base while inside of the first paddle shaft until a set of displaceable opposing buttons of snap button base are aligned with a set of corresponding holes of the first paddle shaft; and
locking the first paddle shaft to the second paddle shaft to maintain the desired water paddle feathered position by bringing a free end of the first paddle shaft further towards a free end of the second paddle shaft until the user hears an auditory indicator of positive locking connection confirmation.

20. The method of claim 19 including the step of bringing the free end of the first paddle shaft further towards the free end of the second paddle shaft until the user sees positive visual locking connection confirmation identified by an engagement of the displaceable opposing buttons of snap button base with the corresponding holes of the first paddle shaft.

* * * * *